United States Patent [19]
Yamamoto

[11] Patent Number: 5,097,249
[45] Date of Patent: Mar. 17, 1992

[54] POWER STATUS DETECTING APPARATUS

[75] Inventor: Yasuyuki Yamamoto, Kanagawa, Japan

[73] Assignee: Sony Corporation, Tokyo, Japan

[21] Appl. No.: 522,725

[22] Filed: May 14, 1990

[30] Foreign Application Priority Data

May 16, 1989 [JP] Japan .................................. 1-122449
Jul. 10, 1989 [JP] Japan .................................. 1-177402

[51] Int. Cl.⁵ .......................................... H04M 11/04
[52] U.S. Cl. ......................... 340/310 CP; 340/310 R;
340/310 A; 340/511; 340/635; 340/657;
340/660; 340/825.69; 340/825.72; 358/194.1;
307/126; 455/353; 359/146
[58] Field of Search ........ 340/310 R, 310 A, 310 CP,
340/509, 511, 635, 656, 657, 660, 825.69,
825.72; 358/190, 194.1; 455/352, 353, 603, 151;
307/126, 128

[56] References Cited

U.S. PATENT DOCUMENTS

| | | | |
|---|---|---|---|
| 3,971,028 | 7/1976 | Funk | 340/310 CP |
| 4,703,306 | 10/1987 | Barrift | 340/310 CP |
| 4,755,792 | 7/1988 | Pezzolo et al. | 340/310 CP |
| 4,899,129 | 2/1990 | MacFadyen et al. | 340/310 CP |

Primary Examiner—Donnie L. Crosland
Attorney, Agent, or Firm—Hill, Van Santen, Steadman & Simpson

[57] ABSTRACT

A power status detecting apparatus which is to be applied to a plurality of audio-visual equipments arranged such that currents flowing to AC lines of the respective equipments are detected so as to identify the power condition status of the respective equipments and in which identified information are supplied to a system control apparatus. Thus, system control for a plurality of equipments can be performed more positively and conveniently.

4 Claims, 7 Drawing Sheets

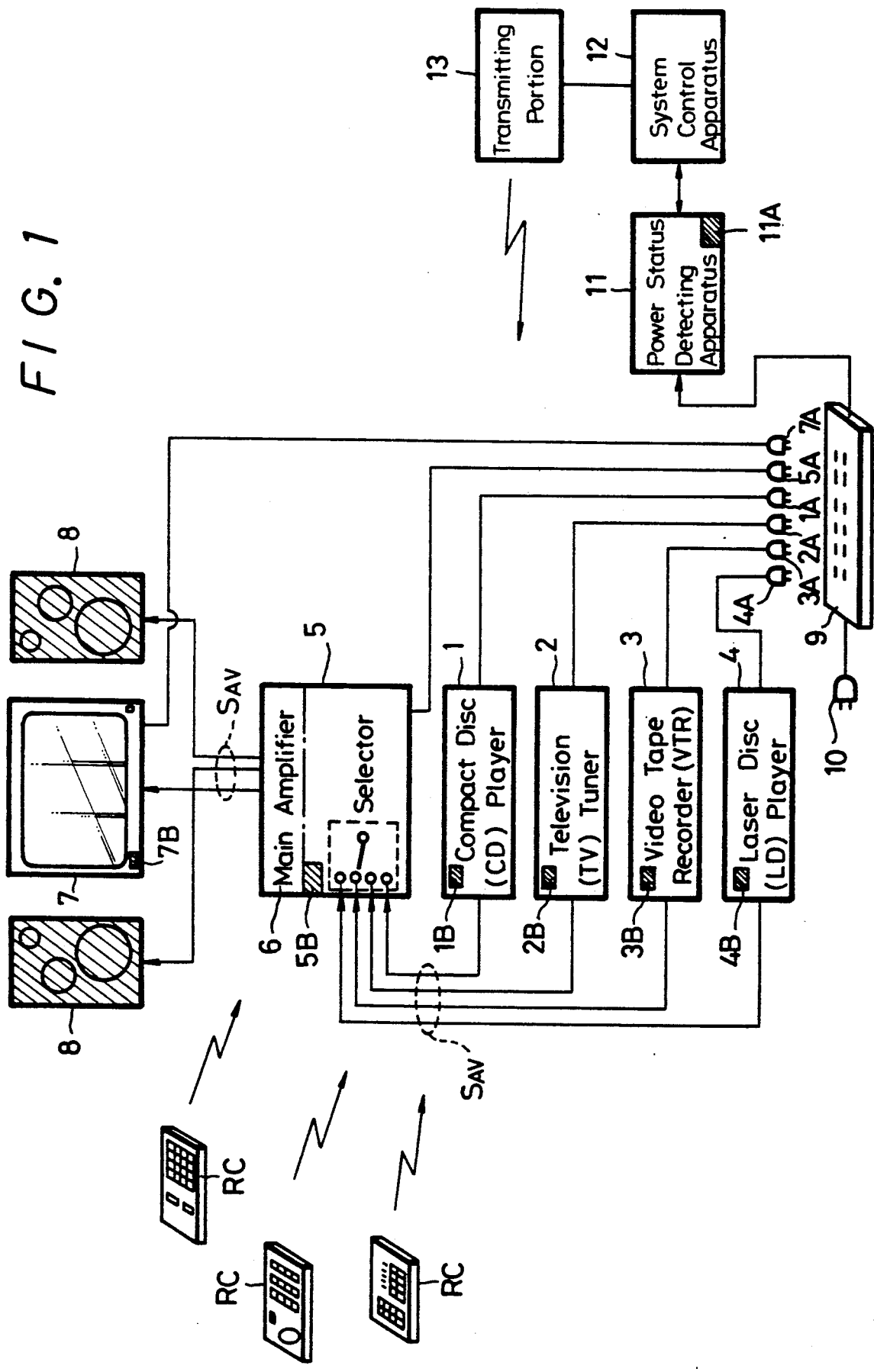

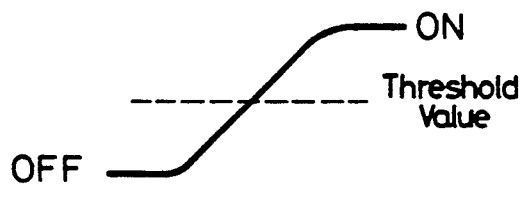
FIG. 2A
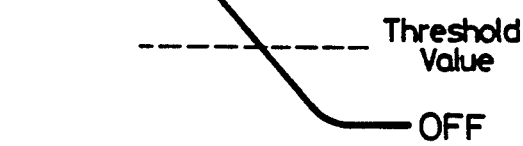
FIG. 2B
FIG. 3
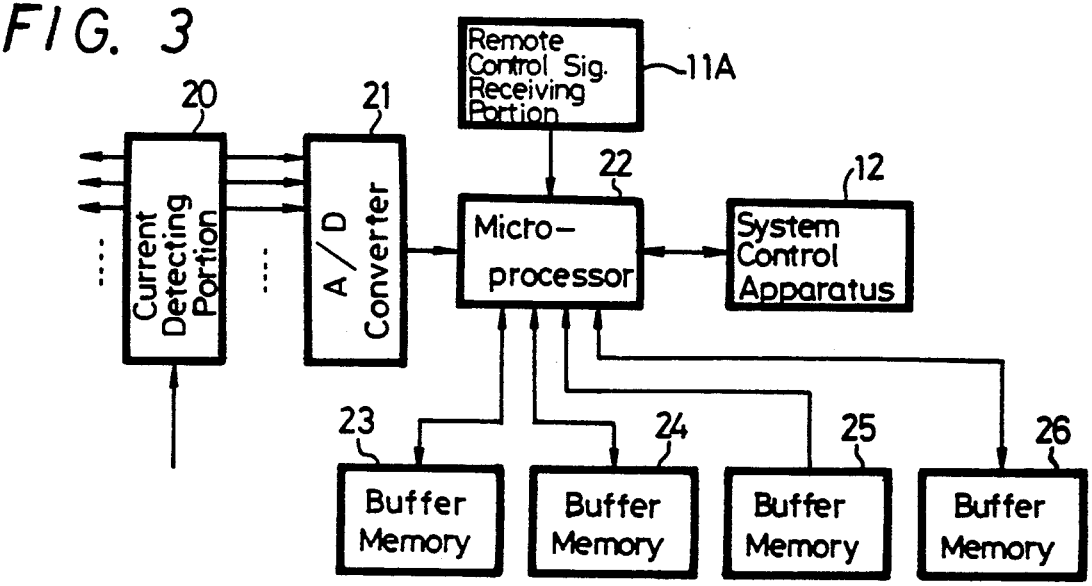
FIG. 4
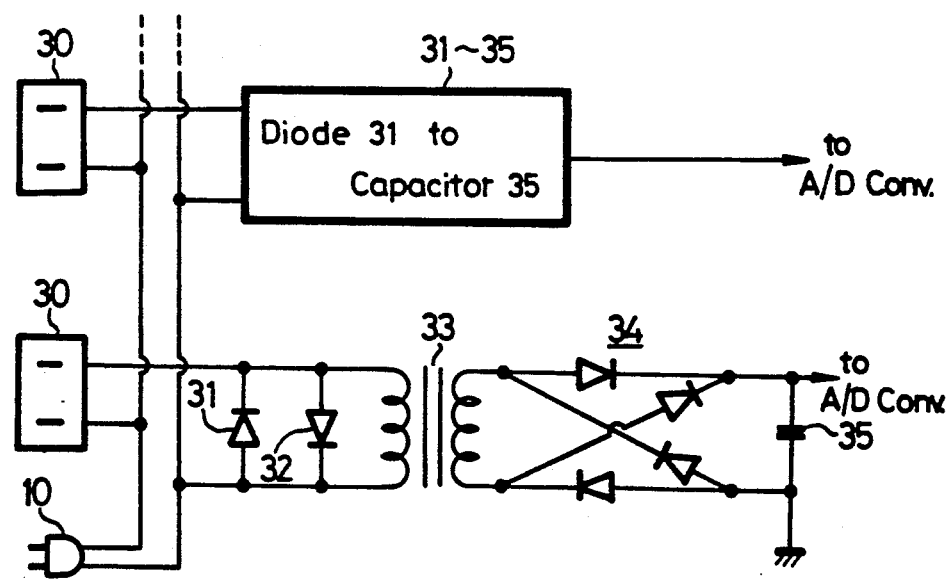

POWER STATUS DETECTING APPARATUS

BACKGROUND OF THE INVENTION

1. Field of the Invention

The present invention relates generally to power status detecting apparatus and, more particularly, is directed to a power status detecting apparatus for use with electric products which use home AC power sources and which are controlled by a remote controller.

2. Description of Related Art

Generally, in equipment which are to be controlled by a remote controller, a power switch is turned ON and OFF by a power control signal from a remote controller. That is, a toggle switch operation is accomplished.

When a user controls various audio-visual apparatus such as a video tape recorder (VTR), a compact disc (CD) player, a laser disc (LD) player, a tuner, a tape deck or the like by utilizing a remote controller, the user observes so as to check if power is ON or OFF on the various units. For example, if initially the power switch of a television receiver is in the OFF state, the user has to depress a power switch of the remote controller for the television receiver so as to turn its power switch ON, and then the user selects a certain television channel to watch.

However, when certain equipment is required to be controlled by the use of a system control apparatus, if its power status is not clear, then the system control apparatus does not know whether a first power source control command should be issued.

To remove this disadvantage, a bidirectional control bus system such as a so-called home bus system have been recently proposed. According to such bidirectional control bus system, the power status of each apparatus can be automatically identified by using bus lines such that a so-called interlocking system operation is possible.

More precisely, when the user wants to play, for example, a video tape recorder, by pushing a play button of a remote controller for the video tape recorder directly, it is possible to automatically turn ON equipments necessary for the playing back operation of the video tape recorder which include, for example, a television monitor receiver, a video tape recorder and an audio amplifier, so that the play operation of the video tape recorder will start. In this case, unnecessary equipments such as a compact disc (CD) player or the like will have their power switches automatically turned OFF.

In old types of equipments which do not have the home bus terminal, however, the systematic control such as described above cannot be accomplished.

OBJECTS AND SUMMARY OF THE INVENTION

Accordingly, it is an object of the present invention to provide an improved power status detecting apparatus which can eliminate the defects encountered in the prior art.

More specifically, it is an object of the present invention to provide a power status detecting apparatus with which systematic control of a plurality of equipments can be carried out positively and in a convenient manner.

Another object of the present invention is to provide a power status detecting apparatus with which a plurality of all type equipments, which cannot be controlled by a so-called home bus control, can be controlled by a systematic control operation.

According to an aspect of the present invention, a power status detecting apparatus which is to be applied to a plurality of audio-visual equipment comprises a plurality of AC outlets to which power plugs of the plurality of audio-visual equipments are connected, and a circuit is connected to each of the AC outlets so as to detect AC currents at each of the AC outlets, and a circuit is connected to the AC current detecting circuit so as to determine the power condition status of the respective audio-visual equipments.

The preceding, and other objects, features and advantages of the present invention, will be apparent from the following detailed description of the preferred embodiments when read in conjunction with the accompanying drawings, in which like reference numerals are used to identify the same or similar parts in the several views.

BRIEF DESCRIPTION OF THE DRAWINGS

FIG. 1 is a schematic diagram showing a first embodiment of a power status detecting apparatus according to the present invention;

FIGS. 2A and 2B are schematic diagrams used to explain the operation of the power status detecting apparatus shown in FIG. 1;

FIGS. 3 and 4 are block circuit diagrams of a main portion of this invention, and illustrate a practical circuit arrangement;

DETAILED DESCRIPTION OF PREFERRED EMBODIMENTS

Figure 5:
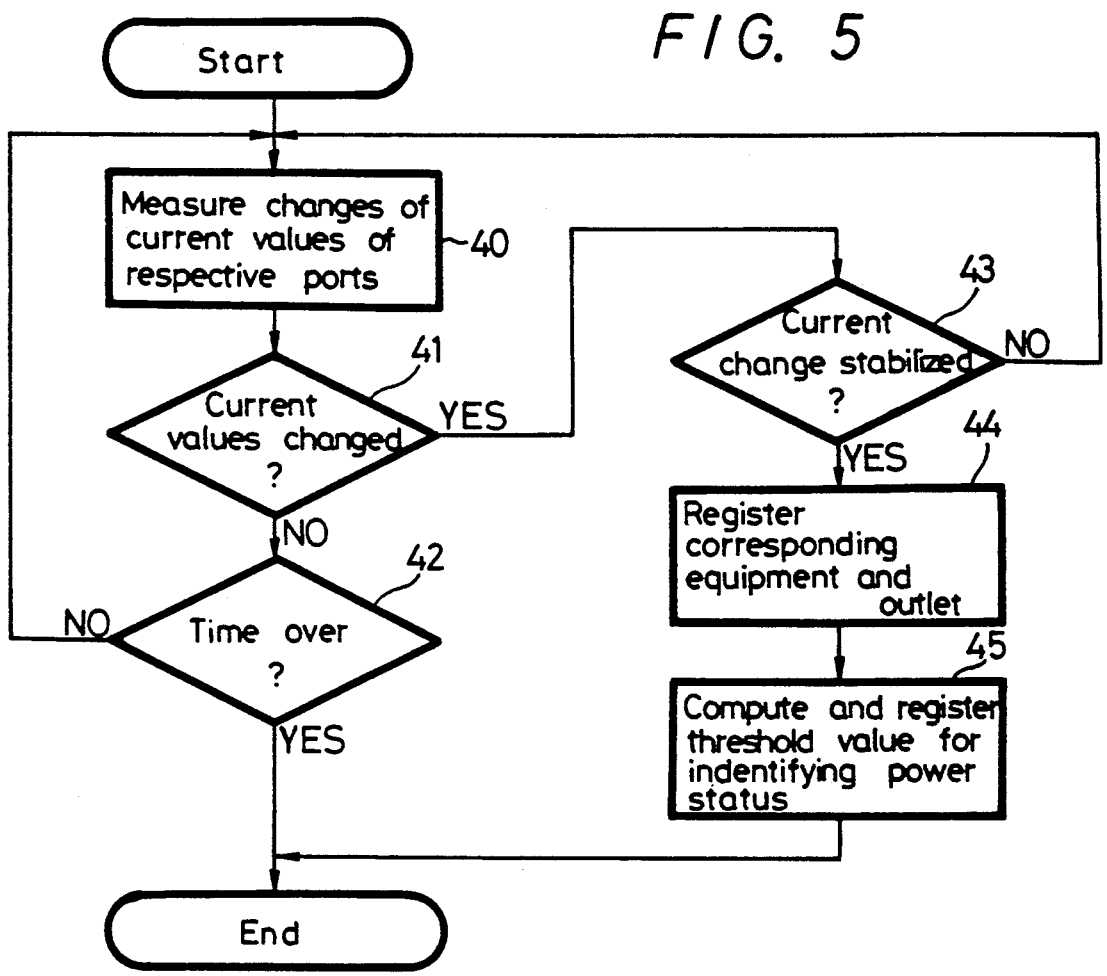
FIG. 5 is a flow charts to which reference will be made for explaining the operation of the present invention.

The present invention will now be described in detail with reference to the drawings.

FIG. 1 shows a first embodiment of a power status detecting apparatus according to the present invention, connected to, for example, an audio-visual (AV) system.

Referring to FIG. 1, a plurality of audio-visual equipments are shown, such as, a compact disc (CD) player 1, a television (TV) tuner 2, a video tape recorder (VTR) 3 and a laser disc (LD) player 4. An audio or video signal $S_{AV}$ from these audio-visual equipments is supplied to a selector 5. The audio or video signal $S_{AV}$ which is supplied to the selector 5 is supplied through a main amplifier 6 incorporated in the selector 5 to a monitor television receiver 7 or to speakers 8 where it is reproduced as audio and/or a video picture.

There are provided remote controllers RC which can accomplish remote control operation by transmitting infrared remote control signals. Generally, the audio-visual equipments are provided with their own remote controllers, respectively, which transmit infrared remote control signals to the corresponding audio-visual equipments. For this purpose, the audio-visual equipments are provided with light receiving means 1B, 2B, 3B, 4B, 5B and 7B, respectively.

There is provided a power table tap 9 in which there can be inserted power source plugs 1A, 2A, 3A, 4A, 5A and 7A of the respective audio-visual equipments. Power tap 9 has a main power plug 10. The power status of the audio-visual equipments are controlled in a toggle-fashion in response to the power control signals from the remote controllers RC.

As shown in FIG. 1, there is provided a power status detecting apparatus 11 of the present invention which detects the power status of the respective audio-visual equipments. The power status detecting apparatus 11 is provided with a receiving portion 11A which receives the remote control signals from the respective remote controllers RC of the audio-visual equipments.

The remote control signal used in this embodiment will be described. The remote control signal is transmitted from the remote controller RC in the form formed of a command and an identification (ID) signal for the equipment. Accordingly, the signal from the remote controller of, for example, the video tape recorder 3 is effective only to control the video tape recorder 3. However, the receiving portion 11A of the power status detecting apparatus 11 can receive the remote control signals from the remote controllers RC of all of the equipments. A system control apparatus 12 is capable of transmitting a command signal to the power status detecting apparatus 11 and is capable of receiving a signal from the power status apparatus 11 corresponding to the respective audio-visual apparatuses. A transmitting portion 13 is connected to the system control apparatus 12 so as to transmit infrared remote control signals to the respective audio-visual equipments.

The power status detecting apparatus 11 determines a threshold value, which is an intermediate value between a current value corresponding to power source OFF and a current value corresponding to power source ON when the power status is changed from OFF to ON as shown in FIG. 2A. It also determines a threshold value, which is an intermediate value between a current value corresponding to power source ON and a current value corresponding to power source OFF when the power status is changed from ON to OFF as shown in FIG. 2B. The power status detecting apparatus 11 then identifies that the power of the equipment is ON if the detected current value is larger than the threshold value, and that the power of the equipment is OFF if the detected current is smaller than the threshold value.

The signal which indicates the status of the power status is supplied to the system control apparatus 12. The system control apparatus 12 responds to the remote control signal received at the receiving portion 11A to effect various system control operations on the basis of the power status of the respective equipments as follows: If the user does not want some equipments which are in the ON-state to be on, the power of the corresponding equipments are turned OFF by the power control signal from the transmitting portion 13. If the user wants some equipments which are in the OFF state to be on, then the power of the equipments which are desired on are turned ON by the power control signal from the transmitting portion 13 under the control of the system control apparatus 12.

FIG. 3 shows an example of a practical circuit arrangement of the power status detecting apparatus 11 shown in FIG. 1. The power status detecting apparatus 11 comprises a current detecting portion 20 which is connected to an analog-to-digital (A/D) converter 21. A micro-processor 22 is connected to the A/D converter 21 and is connected to a buffer memory 23 which stores an initial value of the power source currents which correspond to each of the equipments. A second buffer memory 24 which stores threshold current values corresponding to each of the equipments is also connected to the micro-processor 22 as also is a buffer memory 25 in which codes of various control signals of the respective equipments are stored as data bases. A fourth buffer memory 26 in which data corresponding to ports connected to the respective equipments are stored is also connected to micro-processor 22.

FIG. 4 illustrates a main portion of the current detecting portion 20 shown in FIG. 3 which corresponds to the audio visual equipment.

As shown in FIG. 4, outlets 30 mounted in the table tap 9 (see FIG. 1), are connected to the main power source plug 10, and diodes 31 and 32 which have opposing polarities have first sides connected to one of two lines which connect the outlet 30 and the main power source plug 10. A transformer 33 is connected in parallel to diodes 31 and 32. A full-wave rectifying circuit 34 of a bridge type is connected to the secondary of the transformer 33, and a capacitor 35 is connected across the output side of the full-wave rectifying circuit 34.

In the current detecting section 20 of FIG. 3, a current is detected and is supplied to the A/D converter 21, where it is converted from an analog signal to a digital signal, and is then fed to the micro-processor 22. In the micro-processor 22, the threshold values necessary for identifying the power status of the respective equipments which are connected to the outlets 30 of the table tap 9 are detected for every equipment and are then stored. A flow chart forming FIG. 5 is used to explain the manner of determining the threshold values.

Initially, the manner determining the threshold value for the CD player 1 will be described. A current control command is issued from the remote controller RC to the CD player 1. The current control command which has been transmitted is received by the remote control signal receiving portion 1B of the CD player 1 and also is received by the receiving portion 11A of the power status detecting apparatus 11.

As shown in FIG. 5, after the Start of operation, the changes of current values at respective outlets 30 of the table tap 9 are measured in step 40. Then, the processing by the micro-processor 22 proceeds to the next decision step 41. In step 41, the current values measured in step 40 are compared with initial values which have been previously measured, and it is determined whether or not changes of current values at the respective outlets 30 have occurred. If it is determined that no change of current value has occurred which is represented by a NO at step 41, then the processing by the micro-processor 22 proceeds to the next decision step 42. In decision step 42, it is determined whether or not the measuring time exceeds a predetermined measuring time. If it is determined that a NO is output at step 42, then the processing by the micro-processor 22 returns to step 40, and the above-described operations are repeated. In that case, when the measuring time exceeds the predetermined measuring time, if it is determined that no changes of the current values have occurred at the respective outlets 30, it is determined that the CD player 1 is not connected to any one of the table taps 9 and processing is ended.

If on the other hand it is determined that changes of currents are detected as represented by a YES at step 41, then the processing proceeds to the next decision step 43. In step 43, it is determined whether or not the current change is stabilized. If it is determined that the current change has not yet stabilized as represented by a NO at step 43, then the processing by the micro-processor 22 returns to step 40, and the above-described operations are repeated. If it is determined that the current change has stabilized as represented by a YES at step 43, then the processing proceeds to step 44. In step 44, data which indicates the particular equipment for which the current value has changed (in this case, the CD player 1) and the corresponding outlet 30 which is connected to the CD player 1 are registered in the equipment data register buffer memory 26 based on the data the buffer memory 25. Then, the processing of the micro-processor 22 proceeds to step 45, and a threshold value for the CD player 1 is computed using as a basis the initial current value and the present current value. Then, the threshold value for identifying the power status of the CD player 1 is stored in the buffer memory 24 and the processing by the micro-processor 22 is ended. Thus, the threshold value for the CD player 1 is determined as described above. Threshold values for the other equipments which are connected to the table tap 9 are determined in a manner similar to that described above.

After the threshold values for identifying the power status of the respective equipments have been once determined as described above, the micro-processor 22 can easily identify the power status of the respective equipments on the basis of the outputs of the threshold buffer memory 24. In that case, in association with the buffer memory 26, the system control apparatus 12 can detect the relationship between the outlet 30 and the equipment which is connected thereto, if necessary.

The system control apparatus 12 controls the following system operation.

Referring back to FIG. 1 when a power control command is transmitted from the remote controller RC of, for example, the CD player 1 to the receiving portion 1B of the CD player 1, to cause power to the CD player 1 to be turned ON. Then, the power status detecting apparatus 11 identifies that the CD player 1 has been placed in the ON state. The power status detecting apparatus 11 supplies the system control apparatus 12 with data which indicates the power status of all equipment which are connected to the table tap 9, including power status data which shows that the power source of the CD player 1 has been turned ON. The system control apparatus 12 performs various kinds of identifications and transmits commands necessary for the operation of the CD player 1 to the respective equipments from the transmitting portion 13. When the selector 5, for example, is supplied with a command for changing-over the input of the main amplifier 6 to the CD player 1, an audio signal from the CD player 1 is supplied to the main amplifier 6. Of course, in that case, the television tuner 2 is not needed so that, if the power of the television tuner 2 is in the ON state, then a current control command to turn the power of the television tuner 2 OFF is transmitted from the transmitting portion 13 to the receiving portion 2B of the television tuner 2, so that the power to the television tuner 2 will be turned OFF. As is clear from the first embodiment of the invention as described above, the currents which flow to the outlets of the respective equipments are detected so as to identify the power status of the equipments, and such identified information is supplied to the system control apparatus and is then used to effect succeeding system control operation.

Figure 6:
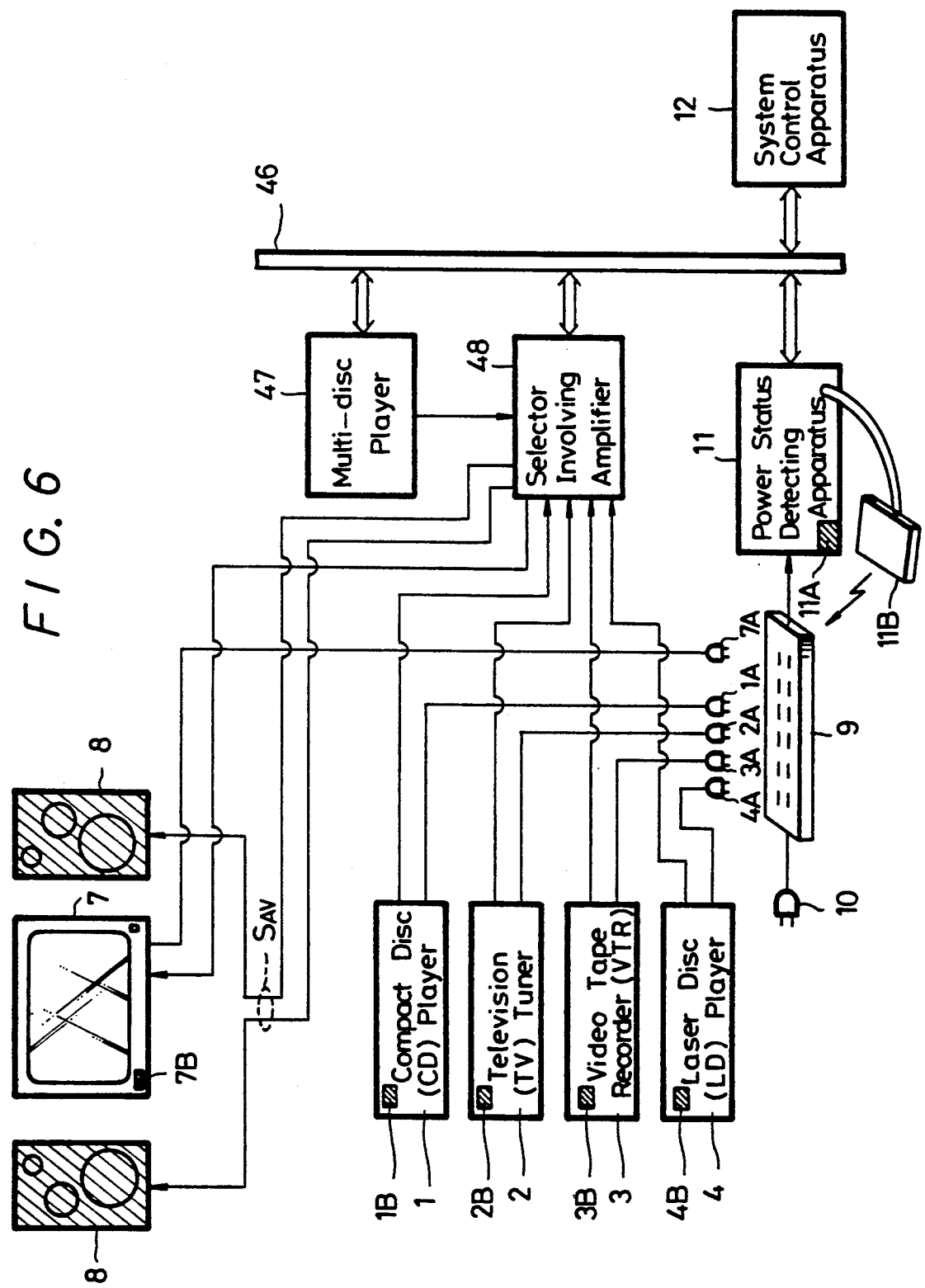
FIG. 6 is a schematic diagram showing a second embodiment of the power status detecting apparatus according to the present invention.

FIG. 6 shows a second embodiment of the power status detecting apparatus according to the present invention. In this embodiment, the present invention is applied to an audio-visual system. In FIG. 6, like parts which correspond to those of FIG. 1 are marked with the same reference numerals and will not be again described in detail.

In this embodiment, the power status detecting apparatus 11 is provided with a remote control signal transmitting portion 11B. The power status detecting apparatus 11 sequentially transmits from the remote control signal transmitting portion 11B power control signals for controlling the power of the respective audio-visual equipments and can identify the status with particular equipments and can set the power status identifying threshold values in a manner similar as in the first embodiment shown in FIG. 1. If the current detected is larger than such threshold value, it is identified that the power of that apparatus is in the ON state, whereas if the current which is detected is smaller than the threshold value, it is identified that the power of that particular apparatus is in the OFF state. Then, the identified result is transmitted to the system control apparatus 12, where it is used to control the succeeding system control operation.

In the embodiment shown in FIG. 6, the system control apparatus 12 is connected to a home bus 46. The home bus 46 is connected to equipments which have home bus terminals, such as, a multi-disc player 47, a selector with an amplifier 48 and the like. The selector 48 can select the respective equipments provided at the audio-visual side.

Figure 7:
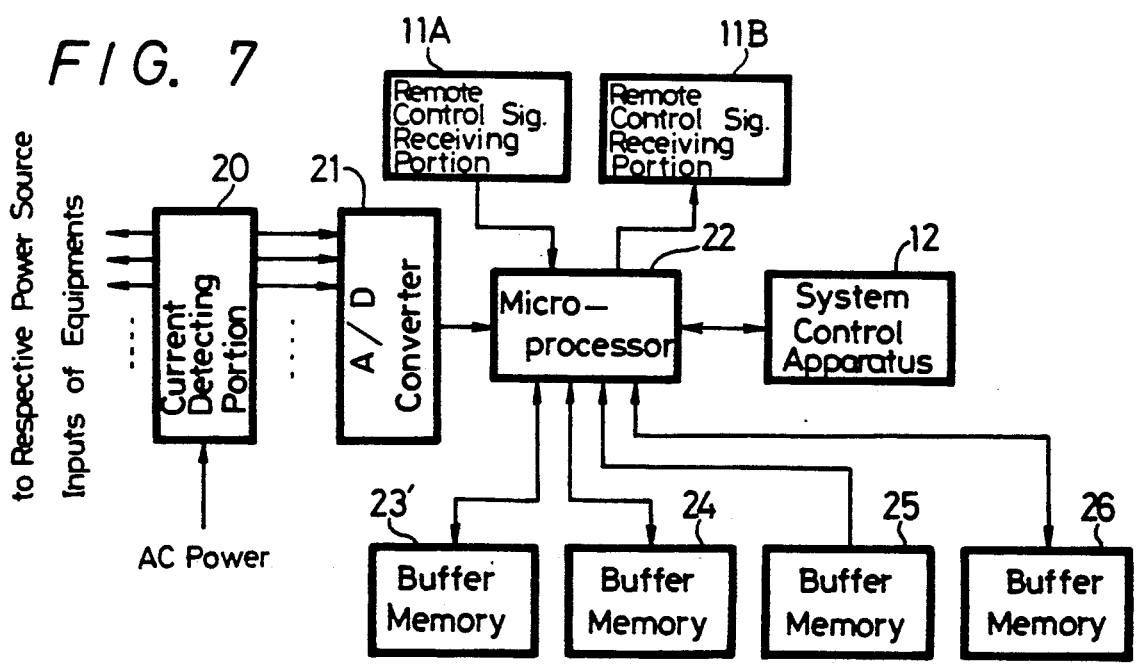
FIG. 7 is a block circuit diagram of a main portion of the second embodiment of the invention, and illustrates a practical circuit arrangement.

FIG. 7 shows an example of a practical circuit arrangement of the power status detecting apparatus 11 used in the second embodiment shown in FIG. 6. This practical circuit arrangement of the power status detecting apparatus 11 is substantially the same as that of FIG. 3 and differs only in that, while the micro-processor 22 shown in the example of FIG. 3 is provided with a remote control signal receiving portion 11A, the micro-processor 22 shown in the example of FIG. 7 is provided with a remote control signal transmitting portion 11B as well as the remote control signal receiving portion 11A.

The micro-processor 22 is provided with the remote control signal transmitting portion 11B so that it can automatically determine the threshold values for the respective equipments.

Also in this case, the current which is detected by the current detecting portion 20 is supplied to the A/D converter 21, in which it is converted from an analog signal to a digital signal, and it is then fed to the micro-processor 22. The micro-processor 22 is programmed so as to automatically determine the threshold values so as to identify the power statuses of the respective equipments. The manner of determining the threshold values will be described herein with reference to the flow chart of FIG. 8.

Figure 8:
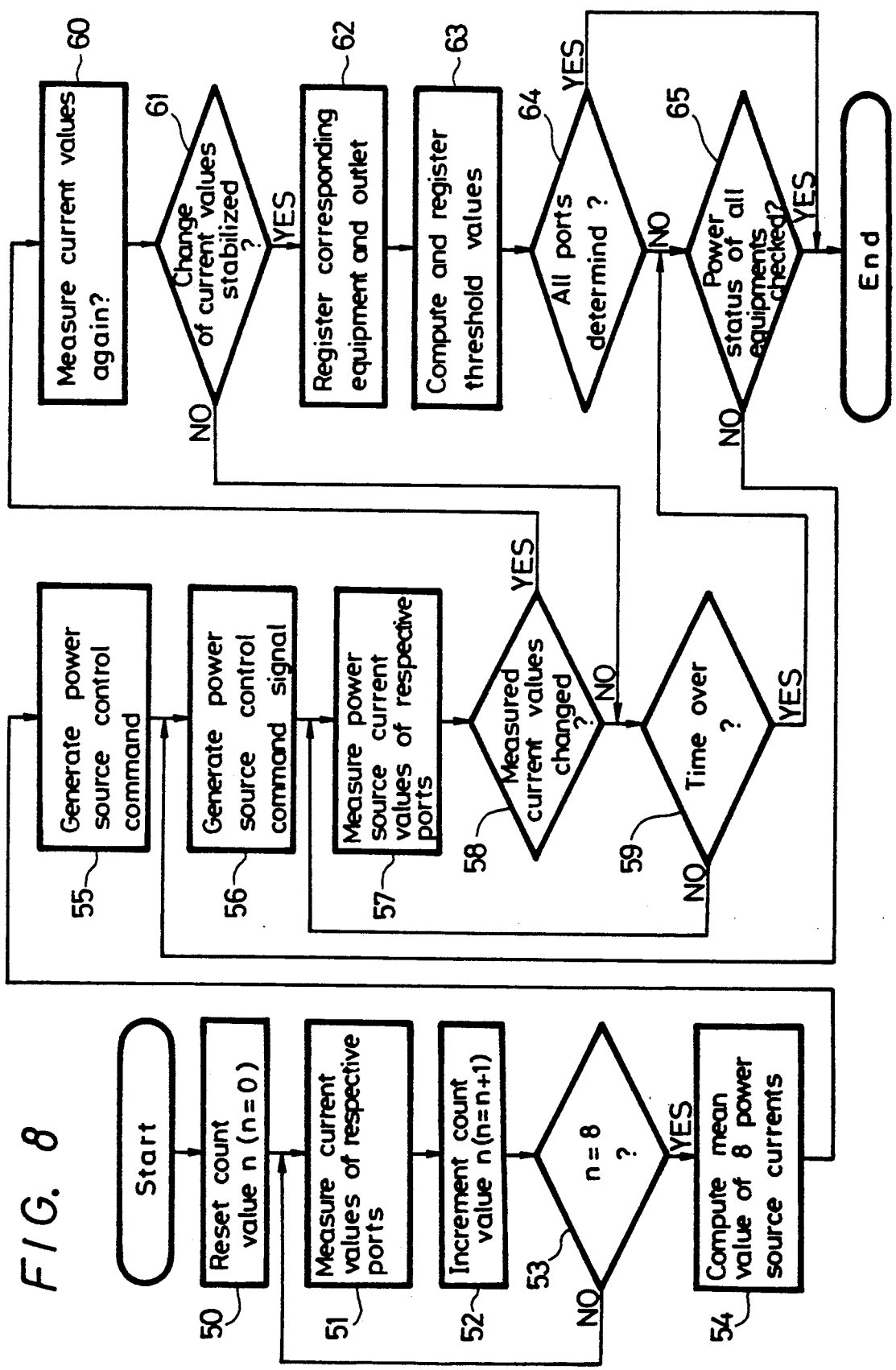
FIG. 8 is a flow chart to which reference will be made for explaining the operation of the second embodiment of the invention.

Referring to FIG. 8, following the Start of operation, the processing by the micro-processor 22 proceeds to step 50 In step 50, a count value of a counter (not shown) provided within the micro-processor 22 is reset to zero (n=0). Then, the processing of the micro-processor 22 proceeds to step 51, wherein power source current values of the respective equipments which are connected to the respective ports, i.e. outlets are measured. In the next step 52, the count value n of the counter is incremented by one, and the processing of the micro-processor 22 proceeds to the next decision step 53. If n=8 is not established as represented by a NO at step 53, then the processing of the micro-processor 22 returns to step 51, in which the described operations are repeated so as to measure the power source current values of the respective equipments.

If the count value of the counter is determined as n=8 as represented by a YES at step 53, then the processing of the micro-processor 22 proceeds to step 54. In step 54, a mean value of 8 power source current values with respect to the respective ports is computed and the computed values are stored in the buffer memory 23' as initial values.

The procession by the micro-processor 22 proceeds to step 55, in which power control command data is generated from a remote control signal data base buffer memory 25. In the next step 56, a power control command signal (remote control signal) is generated from the transmitting portion 11B of the micro-processor 22. At step 57, power source current values of all equipments connected to the outlets 30 are measured.

The processing by the micro-processor 22 proceeds to the next decision step 58, in which it is determined whether or not the power source current values which were measured at step 57 have changed relative to the initial value. If they have not changed as represented by a NO at step 58, then the processing of the micro-processor 22 proceeds to the next decision step 59. In step 59, it is determined whether or not the measuring time exceeds the predetermined measuring time. If a NO is output at step 59, then the processing of the micro-processor 22 returns to step 57. Then, the above-described operations are repeated. If on the other hand a YES is output at step 59, or if the measuring time exceeds the predetermined measuring time, then it is determined that the corresponding equipment is not connected to the outlet 30. Then, the processing of the micro-processor 22 proceeds to the next decision step 65.

If on the other hand it is determined that the power source current values measured at step 57 have changed as represented by a YES at step 58, then the processing by micro-processor 22 proceeds to step 60. At step 60, the power source current values are again measured in order to remove unstable elements. Then, the processing of the micro-processor 22 proceeds to the next decision step 61. In step 61, it is determined whether or not changes of the power source current value have stabilized. If the change of the power source current value have not yet stabilized as represented by a NO at step 61, then the processing of the micro-processor 22 returns to step 59. If the changes of the power source current value have stabilized as represented by a YES at step 61, then the processing of the micro-processor 22 proceeds to step 62, in which data indicative of a correspondence between the power source port and the set, i.e., data indicative of a correspondence between the outlet and the equipment connected to the outlet is registered in the equipment registration buffer memory 26.

Then, the processing of the micro-processor 22 proceeds to step 63, in which a threshold value which is used to identify the power status is computed on the basis of the previously-measured power source current value and is then stored in the buffer memory 24. The processing of the micro-processor 22 proceeds to the next decision step 64, in which it is determined whether or not the status of all of the ports have been determined. If the status of all ports have been determined as represented by a YES at step 64, then the processing of the micro-processor 22 ends. If on the other hand all ports have not yet been determined at step 64, then the processing of the micro-processor 22 proceeds to the next decision step 65. In step 65, it is determined whether or not the power status of all equipments have been checked. In other words, it is determined whether or not the power control signals have been generated for all equipments. If it is determined that all the equipments have not yet been checked as represented by a NO at step 65, then the processing of the micro-processor 22 returns to step 56. From step 56, the above-described operations are repeated. If it is determined that the checking of all the equipments has been finished as represented by a YES at step 65, then the processing of the micro-processor 22 ends.

When the condition that the threshold value for identifying the power status of each equipment has been determined, if the power of a certain equipment is turned ON from its OFF state by the transmitting portion 11B of the power status detecting apparatus 11 or the corresponding remote controller RC of each equipment, then the current value which flows from the corresponding outlet will be changed. If this current value exceeds the above-described corresponding threshold value, the fact that the power of the corresponding equipment has been turned ON is transmitted to the system control apparatus 12.

An example for an application of the system control apparatus 12 shown in FIG. 6 will be described below.

If the user wants to watch the television receiver and operates the television tuner remote controller RC so as to transmit the power source ON signal to the television tuner 2, then the fact that the power source of the television tuner 2 has been turned ON is detected by the power status detecting apparatus 11, and this data is supplied to the system control apparatus 12. The system control apparatus 12 identifies, on the basis of the information received, which one of the equipments should have their power turned ON and selects the corresponding equipment. For this case, the monitor television receiver 7 is turned ON. Then, by controlling the selector 48, the television tuner 2 is selected and is connected to the monitor television receiver 7. In this case, if the power of unnecessary equipment is in the ON state, the transmitting portion 11B generates a power control signal so as that the power of the unnecessary equipment is turned OFF.

As described above, according to the second embodiment of the invention, the currents flowing to the outlets of the respective equipments are detected so as to identify the power status of the respective equipments and such identified information are supplied to the system control apparatus, so that the succeeding system control operations can be accomplished.

Figure 9:
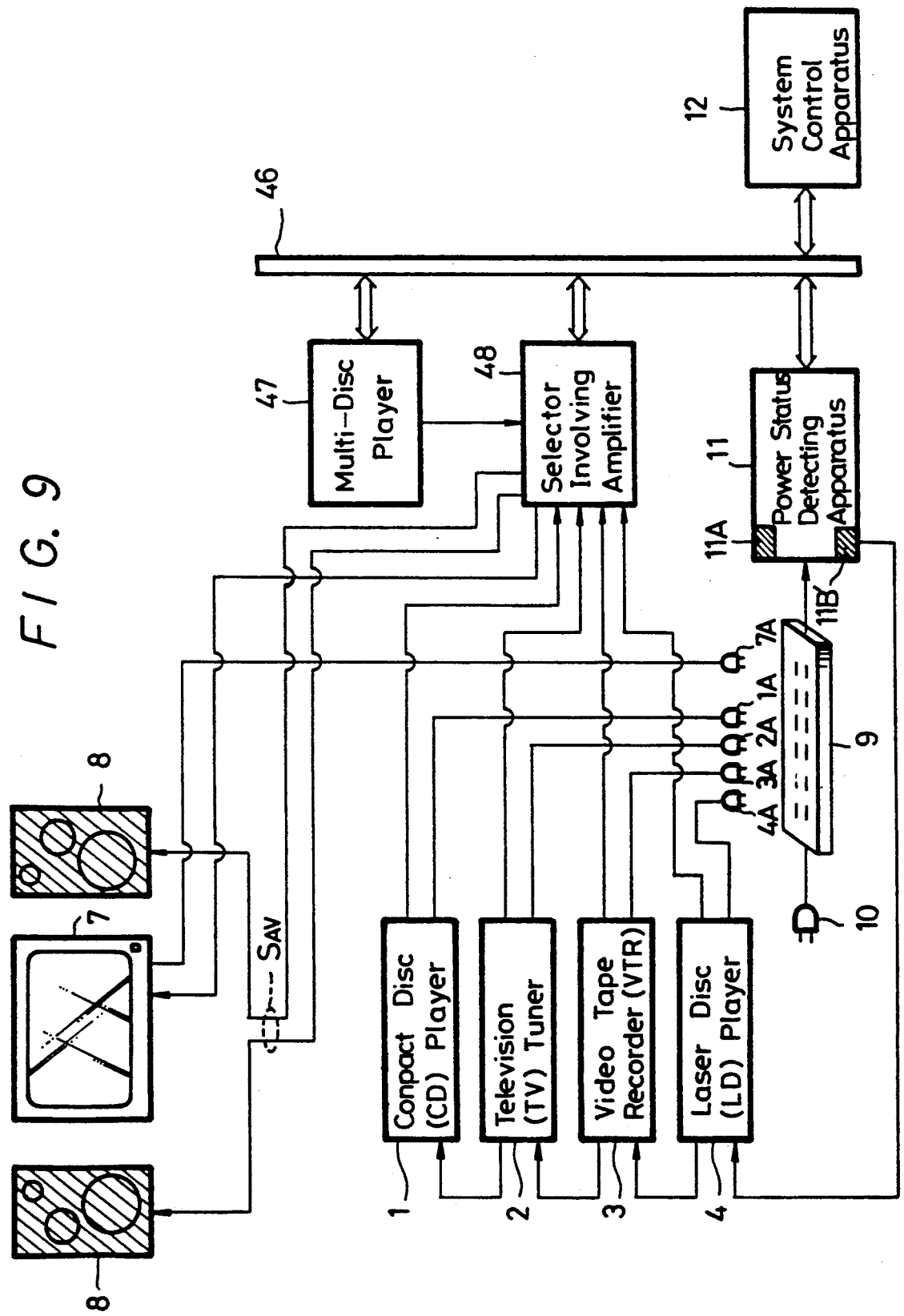
FIG. 9 is a schematic diagram showing an arrangement of a third embodiment of the power status detecting apparatus according to the present invention.

FIG. 9 shows a third embodiment of the power status detecting apparatus according to the present invention, wherein the present invention is applied to the audio-visual system. In FIG. 9, like parts which correspond to those of FIGS. 1 and 6 are marked with the same reference numerals and such portions will not be described in detail.

In accordance with the third embodiment of the invention, as shown in FIG. 9, the power status detecting apparatus 11 is provided with a wired remote control signal transmitting portion 11B' and the receiving portion 11A, and the respective equipments 1 to 4 are provided with one-direction wired remote control terminals. The remote control signal from the remote control signal transmitting portion 11B' is received at the remote control terminals. Accordingly, a command such as a power source control command or the like is transmitted through the wired remote control line. If a command is transmitted to the existing equipment which have such remote control terminals through the wired remote control line, the existing equipment will be prevented from being affected by an external disturbance, and the existing equipment can be operated more positively.

Figure 10:
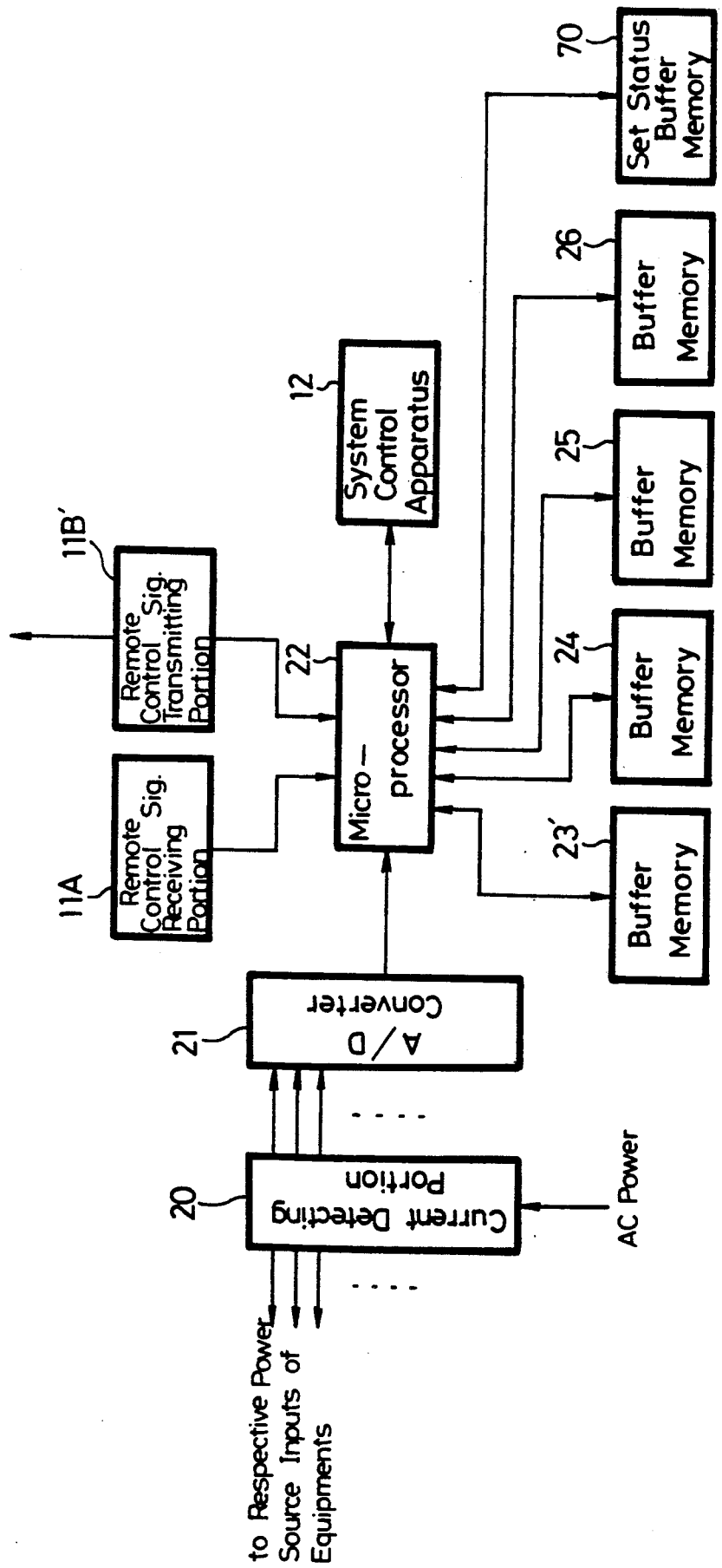
FIG. 10 is a block circuit diagram which shows a main portion of the third embodiment of the present invention.

FIG. 10 shows an example of a practical circuit arrangement of the power status detecting apparatus used in the third embodiment shown in FIG. 9.

As shown in FIG. 10, the micro-processor 22 is provided with both of the remote control signal receiving portion 11A and the remote control signal transmitting portion 11B', which is substantially similar to the equipment shown in FIG. 7. If the respective equipments 1 to 4 are provided with wired remote control terminals, frequently the operation of the remote control signal receiving portions of the respective equipments do not work. As a result, the remote control signal received by the power status detecting apparatus 11 must be supplied to the wired remote control terminals of the respective equipments so that the micro-processor 22 needs both the remote control signal receiving portion 11A and the remote control signal transmitting portion 11B'.

In the practical circuit arrangement shown in FIG. 10, there is provided a set status buffer memory 70 in which transmission commands are classified and are then stored. With the employment of the set status buffer memory 70, the operation status of each of the sets except the power source status can be maintained so that the requirement of status information for each of the sets from the system control apparatus 12 can be satisfied.

If the playback state or the like of, for example, of the video tape recorder 3 is stored in the set status buffer memory 70, when the system control apparatus 12 requests the set status information, the set status information may be read-out by the micro-processor 22 and transmitted to the system control apparatus 12.

In the system control apparatus 12, for example, the following application becomes possible.

When, for example, the remote control signal for turning the video tape recorder 3 ON is generated from the remote controller RC of the video tape recorder 3, this remote control signal is received at the receiving portion 11A of the power status detecting apparatus 11. This received signal is supplied to the system control apparatus 12, so that the monitor television receiver 7 is turned ON. Further, the system control apparatus 12 makes the selector 48 select the video tape recorder 3 and drives the power status detecting apparatus 11 so as to cause power to the video tape recorder 3 to be turned ON from the remote control signal transmitting portion 11B' via the wired remote control line. Thus, the signal reproduced by the video tape recorder 3 can be received and reproduced by the monitor television receiver 7.

As set forth above, according to the present invention, since the currents flowing through AC lines of the respective equipments are detected so as to identify the power status of the respective equipments and the identified information are supplied to the system control apparatus, system control of a plurality of the equipments can be positively and conveniently accomplished.

Furthermore, the present invention is helpful for promoting a so-called bidirectional home-bus system, and in addition, after the home-bus system has been widely made available, the present invention enables the old type equipments to be controlled t some extent by the system control operation.

Having described preferred embodiments of the invention with reference to the accompanying drawings, it is to be understood that the invention is not limited to those precise embodiments and that various changes and modifications could be effected by one skilled in the art without departing from the spirit or scope of the novel concepts of the invention as defined in the appended claims.

I claim as my invention:

1. A power status detecting apparatus which can be applied to a plurality of audio-visual equipments each of which have a power plug, comprising:
    (a) a plurality of AC outlets to which said power plugs of said plurality of audio-visual equipments are connected;
    (b) means connected to each of said AC outlets for detecting AC currents at each of said AC outlets; and
    (c) means connected to said AC current detecting means for determining the power condition status of said respective audio-visual equipments.

2. A power status detecting apparatus as cited in claim 1, wherein each of said plurality of audio-visual equipments has a receiver which is capable of receiving a remote control signal and each of said plurality of audio-visual equipment includes a toggle switch which is connected to the receiver so as to remotely turn on and off power to each of said audio-visual equipments.

3. A power status detecting apparatus as cited in claim 2, wherein said power condition status determining means includes a remote control signal receiving portion for receiving remote control signals from various remote controllers of said audio-visual equipments.

4. A power status detecting apparatus as cited in claim 3, wherein said power status determining means includes a threshold current memory for said audio-visual equipments for storing threshold current values of said audio-visual equipments wherein said threshold current value comprises an "OFF" current value which is a first intermediate value between a current value corresponding to power "OFF" and a current value corresponding to power "ON" and an "ON" current value which is a second intermediate value between power "OFF" and power "ON" values.

* * * * *